UNITED STATES PATENT OFFICE.

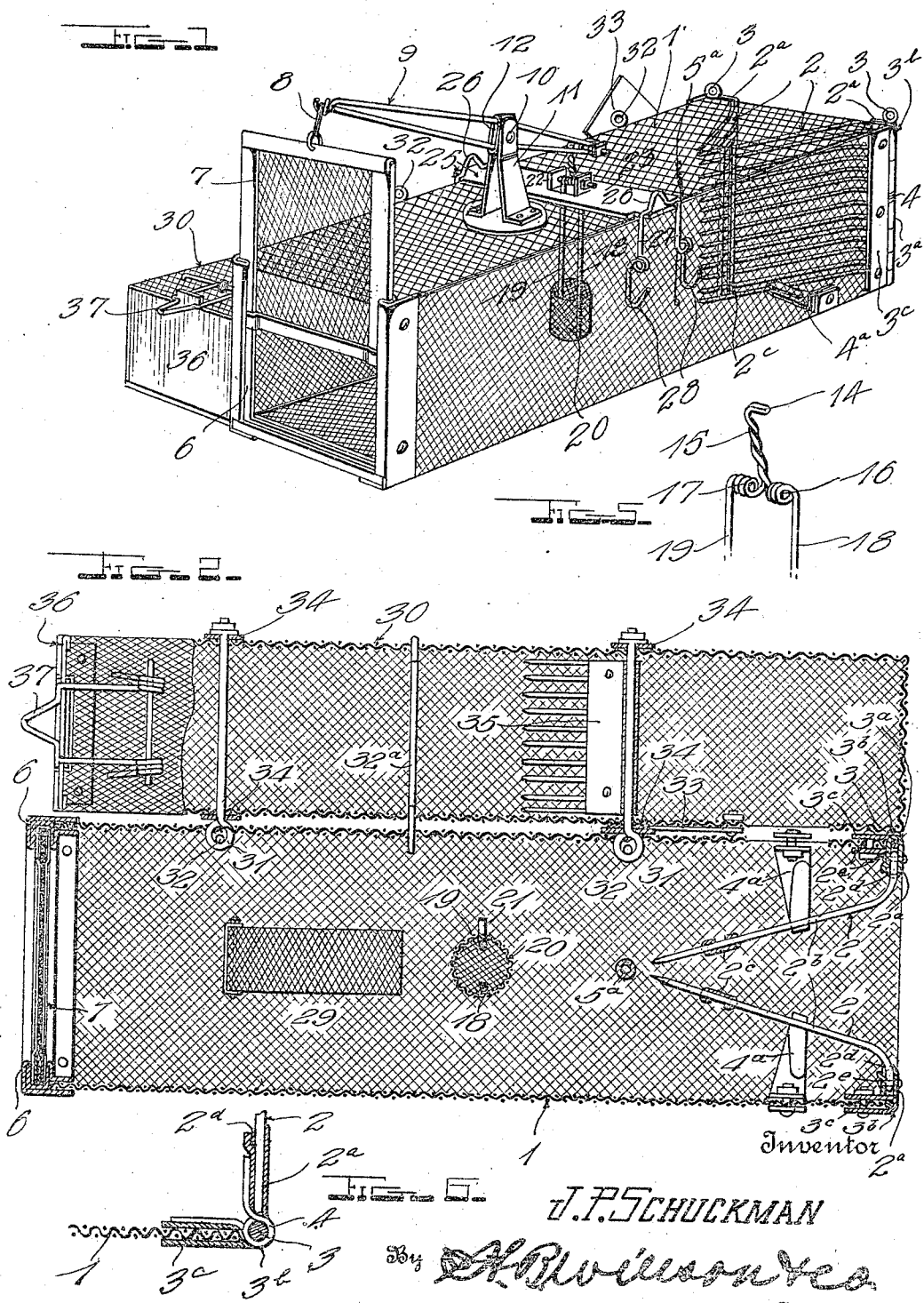

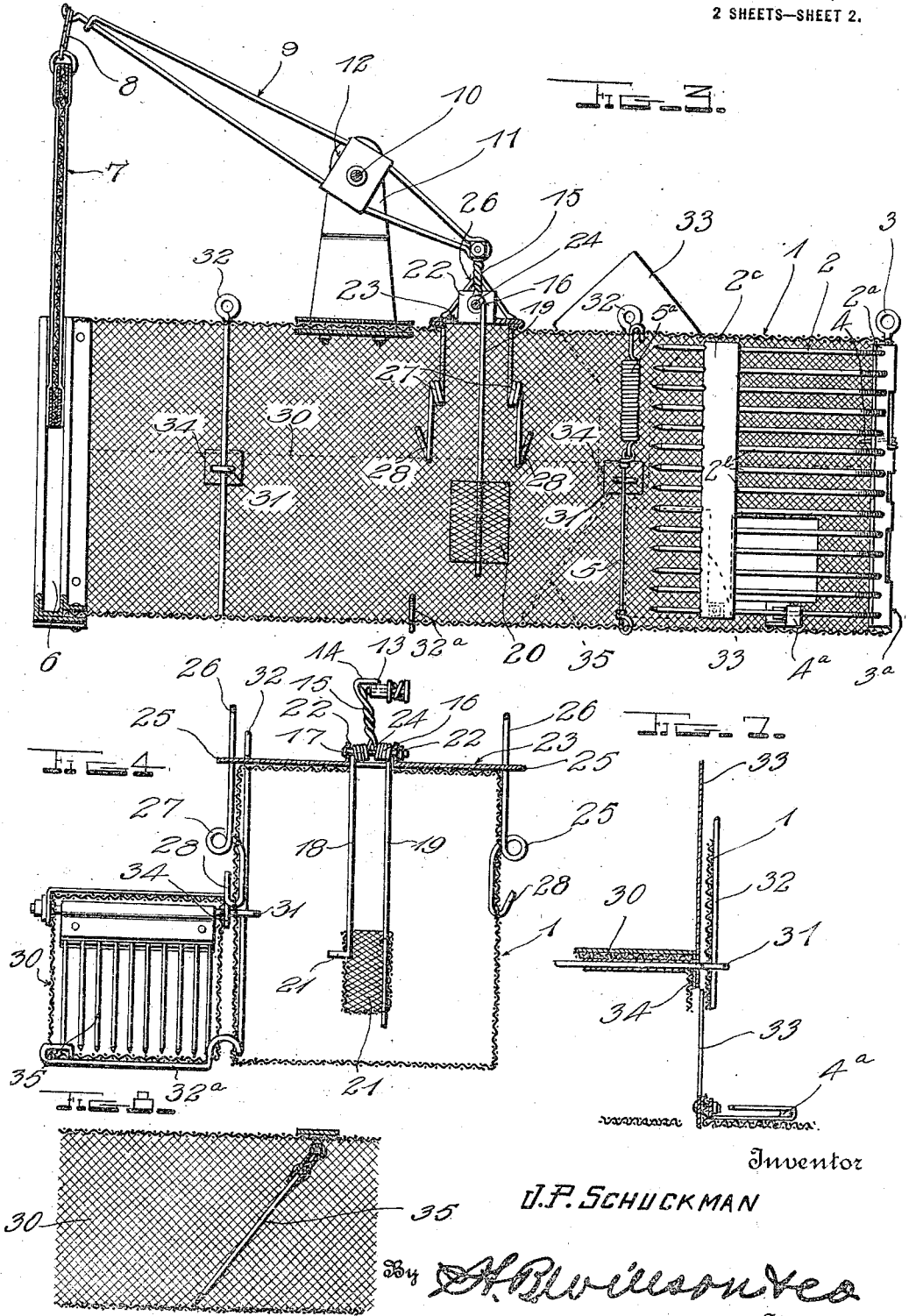

JOHN P. SCHUCKMAN, OF WICHITA, KANSAS.

ANIMAL-TRAP.

1,255,798.

Specification of Letters Patent.

Patented Feb. 5, 1918.

Application filed May 10, 1917. Serial No. 167,778.

*To all whom it may concern:*

Be it known that I, JOHN P. SCHUCKMAN, a citizen of the United States, residing at Wichita, in the county of Sedgwick and State of Kansas, have invented certain new and useful Improvements in Animal-Traps; and I do declare the following to be a full, clear, and exact description of the invention, such as will enable others skilled in the art to which it appertains to make and use the same.

My invention has for its object to provide a simply constructed and inexpensive yet a highly efficient and durable trap for all kinds of large and small animals, the invention consisting in the numerous novel features of construction and combinations of parts hereinafter fully described and claimed, the descriptive matter being supplemented by the accompanying drawings which constitute a part of this specification and in which:

Figure 1 is a perspective view of the improved trap in set position;

Fig. 2 is a horizontal section with one end of the auxiliary cage in elevation;

Fig. 3 is a vertical longitudinal section cut centrally through the main cage;

Fig. 4 is a vertical transverse section of Fig. 3;

Fig. 5 is a perspective view of the upper portion of the trigger;

Fig. 6 is a detail horizontal section through the hinge of one of the pivoted jaws;

Fig. 7 is a detail vertical transverse section cut through the registering passageways of the main and auxiliary cages, showing more particularly the closures for said passageways;

Fig. 8 is a detail longitudinal section of the auxiliary cage showing more particularly the drop wire therein.

In the drawings above briefly described, the numeral 1 has reference to a cage which is by preference formed of woven wire as shown, one end of said cage being closed by a pair of inwardly converging jaws 2 hingedly mounted on vertical rods 3 and forced normally inward by appropriate springs 4. Stop hooks $4^a$ are employed for limiting the inward swinging of both jaws 2 so that when closed they will always assume the same relation.

Each jaw 2 is constructed of a hinge bar $2^a$, prongs $2^b$ and a spacing bar $2^c$ for said prongs. The hinge bar $2^a$ is formed of a strip of sheet metal bent into channel shape with one of its side flanges $2^d$ bent inwardly and forward with perforations through which the inner ends of the prongs $2^b$ extend, each adjacent pair of said prongs being formed of a single wire bent upon itself with its bend or loop located between the flanges $2^d$ and clamped in place by rivets $2^e$ which pass through said flanges and the loops.

The bend of each bar $2^a$ is notched to form hinge knuckles $3^a$ through which the hinge rods 3 pass, said rods also being received in similar knuckles $3^b$, formed on other hinge bars $3^c$ which are secured rigidly to the cage 1.

The spacing bars $2^c$ are constructed of sheet metal strips with their edges bent laterally and formed with perforations through which the prongs $2^b$ extend, said edges being clenched on said prongs as shown.

The jaws 2 may yield outwardly as an animal forces into the trap between them, but if such animal attempts to back out, the prongs $2^b$ will prod his flesh and will prevent escape. There is thus no alternative and he must enter the trap. After once in the trap, the animal will naturally attempt to escape, and in order to cause him to swerve away from the inner ends of the jaws 2 as he approaches them, a fine vertical wire 5 is provided, the lower end of said wire being secured to the bottom of the cage 1 while its upper end is attached to a spring $5^a$ which depends from the top of said cage. By this arrangement, there is no probability of the animal forcing the two jaws apart.

The end of the cage 1, opposite the jaws 2 is formed with guides 6 within which a vertically sliding gate 7 is mounted, said gate being connected by a chain or the like 8 to the outer end of a longitudinally disposed level 9 which is located above the cage 1 and fulcrumed between its ends at 10 to a standard 11 rising from said cage. The standard 11 is preferably of the sheet metal construction shown, whereas the lever 9 will in most cases be formed of a single piece of wire bent into loop-shape with the sides of the loop secured to the edges of a block 12 through which the fulcrum 10 passes.

The end of the lever 9 remote from the chain 8 is provided with a laterally projecting roller 13 coöperating with a finger 14 extending horizontally from the upper end of an arm 15, said finger and arm being formed of a single piece of wire bent upon itself at the outer end of the former as shown clearly in Fig. 4. At the lower end of the arm 15 the two halves of the wire are bent to form a pair of coils 16 and 17 and then depend as shown at 18 and 19 to form resilient arms for securing a bait basket 20 to the trigger formed by the parts just described. The basket 20 is by preference formed of woven wire as shown and the arm 18 will be passed through the meshes thereof substantially as illustrated in Fig. 4, while the laterally bent end 21 of the arm 19 will be sprung into engagement with the basket to support the latter.

The coils 16 and 17 are received between a pair of upstanding ears 22 on a transversely extending plate 23 which overlies the cage 1, and a pivot pin 24 passes through said ears and coils to pivotally support the entire trigger for swinging longitudinally of the trap. The ends of the plate 23 are provided with extensions 25 coöperating with spring catches 26 carried by the sides of the cage 1. Each catch 26 is preferably formed of a single piece of wire bent upon itself to form an arch receiving one of the extensions 25, while the two halves of said wire are coiled at 27 to allow said arch to swing outwardly to release its respective extension when required. The ends of the wire are passed in and out through the mesh of the cage 1 and are preferably bent upwardly at 28 to anchor them. By the construction just described, the two catches 26 may be released and thus the entire plate 23 and the trigger carried thereby may be removed for placing the bait in the basket 20. These parts may then be returned to their normal positions and held by the catches 26.

In setting the trap, after first placing the bait in the basket 20 as described the lever 9 is positioned as shown in Figs. 1 and 2 to support the gate 7 in an elevated position, the roller 13 being now hooked under the finger 14 whereby the parts are held in said position. An animal entering the trap beneath the gate 7 or between the jaws 2, will now attempt to devour the bait with the result that the entire trigger is tripped so that the gate 7 falls by gravity. The provision of the roller 13 makes the trap extremely sensitive as will be obvious.

As an additional inducement to the animal to enter the trap, an ear of corn or other suitable bait may be placed in an openwork container 29 and laid in the trap. The use of this container, however, is optional.

Preferably used in connection with the parts above described, is an auxiliary cage 30 secured detachably to cage 1 by I bolts 31, rods 32, and a hook 32ª, the two cages having registering passageways each provided with a swinging closure 33, the closure of the auxiliary cage 30 being pivoted on one of the I bolts 31, which bolts pass through the upper portion of said cage and through the downturned ends of metal strips 34 extending across the top thereof.

The animals caught in the cage 1 will enter cage 30 through the alined passageways and by means of a drop wire or the like 35 will be prevented from returning. The catch is removed from cage 30 by way of a hinged door 36 having a spring fastener 37.

From the foregoing, taken in connection with the accompanying drawings, it will be obvious that although the improved trap is of simple and inexpensive nature, it will be highly efficient and durable. On account of these advantages, the construction shown and described constitutes the preferred embodiment of the device but it will be understood that within the scope of the invention as claimed, numerous changes may be made without sacrificing the principal advantages. Furthermore, the trap may be made of different sizes and strengths for trapping either large or small animals.

I claim:—

1. In a trap, the combination of a cage, a gate therefor, means for holding said gate open including a bait carrying trigger, a plate extending across the top of the cage and carrying said trigger, the ends of said plate extending beyond the sides of the cage, and a pair of arched wire spring catches passing over said projecting ends for securing the plate detachably in place, the two legs of said arched catches being bent to form coils for retaining said catches in operative position by spring tension and the portions of said legs below said coils being secured to the sides of the cage.

2. In a trap, the combination of a cage, a gate therefor, means for holding said gate open including a trigger, said trigger having a pair of depending spring arms, one of which is provided with an outwardly extending projection, and a bait basket supported detachably by said arms and having means receiving said projection.

3. In a trap, the combination of a cage, a gate therefor, a longitudinal lever connected with said gate for holding the same in open position, a trigger for coöperation with said lever, said trigger being formed of a single piece of wire bent substantially upon itself and having its bent portion extending laterally to form a finger coacting with said lever, the portions of the wire immediately adjacent said finger forming an arm carrying the same and said portions being twisted to form coils through which a pivot pin extends, the free ends of the wire depending below said coils and forming spring arms, one of which is bent outwardly at its extremity, and a bait basket supported by said arms and having means receiving said outwardly bent terminal.

4. A trap comprising a cage having at its entrance a laterally swinging jaw comprising a hinge bar formed of a strip of sheet metal bent into channel shape with the edge of one of its flanges turned inwardly and formed with perforations, wire prongs passing through said perforations and having their inner ends received between the two side flanges of said hinge bar, rivets passing through said flanges for clamping said prongs in place, a second hinge bar having spaced knuckles, the bend of said first named hinge bar being notched to form additional knuckles, and a hinge rod passing through all of said knuckles.

5. A trap comprising a main cage having means for admitting the prey, an auxiliary cage adjacent said main cage, the two having registering passages to permit a trapped animal to enter the auxiliary cage from the other and said auxiliary cage having means therein to prevent return of the animal, a plurality of metal strips extending transversely across the upper side of the auxiliary cage and having their ends bent downwardly into contact with the sides of said cage, transverse I-bolts below the top of the auxiliary cage and passing through the bent ends of said strips, the eyes of said bolts being passed through the side of the main cage, vertical rods passing through said eyes to removably retain them in place, a closure for the passage of the auxiliary cage, said closure being mounted pivotally on one of said I-bolts between the eye thereof and the adjacent bent end of one of said strips, and an additional closure for the passage of the main trap.

6. An animal trap comprising a cage having a pair of inwardly converging outwardly yieldable jaws, and a wire extending across said cage at the inner ends of said jaws to cause an animal to swerve from said ends in attempting to escape from the trap.

7. In a trap, the combination of a cage, a gate therefor, means for holding said gate open including a trigger having a pair of substantially parallel spring arms extending into said cage, the terminal of one of said arms being bent outwardly, and a bait basket supported by said arms and having means receiving said outwardly bent terminal.

In testimony whereof I have hereunto set my hand in the presence of two subscribing witnesses.

JOHN P. SCHUCKMAN.

Witnesses:
WILLIAM KEITH,
L. J. MESSINGER.

Copies of this patent may be obtained for five cents each, by addressing the "Commissioner of Patents, Washington, D. C."